US006499021B1

(12) United States Patent
Abu-Hakima

(10) Patent No.: US 6,499,021 B1
(45) Date of Patent: Dec. 24, 2002

(54) APPARATUS AND METHOD FOR INTERPRETING AND INTELLIGENTLY MANAGING ELECTRONIC MESSAGES

(76) Inventor: Suhayya Abu-Hakima, 22 Balding Crescent, Kanata, Ontario (CA), K2K 2L4

(*) Notice: Subject to any disclaimer, the term of this patent is extended or adjusted under 35 U.S.C. 154(b) by 0 days.

(21) Appl. No.: 09/318,643

(22) Filed: May 26, 1999

(51) Int. Cl.[7] .............................................. G06F 9/445
(52) U.S. Cl. ............................ 706/10; 706/45; 706/46
(58) Field of Search ............................ 709/332; 704/9; 707/2, 5; 434/362; 700/49; 706/10, 45, 46

(56) References Cited

U.S. PATENT DOCUMENTS

| | | | | | |
|---|---|---|---|---|---|
| 5,528,503 | A | * | 6/1996 | Moore et al. | 364/468 |
| 5,555,346 | A | * | 9/1996 | Gross et al. | 706/45 |
| 5,588,009 | A | * | 12/1996 | Will | 714/749 |
| 5,597,312 | A | * | 1/1997 | Bloom et al. | 434/362 |
| 5,619,648 | A | * | 4/1997 | Canale et al. | 709/206 |
| 5,635,918 | A | * | 6/1997 | Tett | 340/7.29 |
| 5,644,686 | A | * | 7/1997 | Hekmatpour | 706/45 |
| 5,652,789 | A | * | 7/1997 | Miner et al. | 379/201.01 |
| 5,742,905 | A | * | 4/1998 | Pepe et al. | 455/461 |
| 5,802,253 | A | * | 9/1998 | Gross et al. | 706/47 |
| 5,825,759 | A | * | 10/1998 | Liu | 370/331 |
| 5,848,406 | A | * | 12/1998 | Mani et al. | 707/2 |
| 5,872,973 | A | * | 2/1999 | Mitchell et al. | 709/332 |
| 5,920,859 | A | * | 7/1999 | Li | 707/5 |
| 5,963,447 | A | * | 10/1999 | Kohn et al. | 700/49 |
| 5,970,490 | A | * | 10/1999 | Morgenstern | 710/10 |
| 6,067,542 | A | * | 5/2000 | Carino, Jr. | 707/4 |
| 6,076,051 | A | * | 6/2000 | Messerly et al. | 704/9 |
| 6,076,053 | A | * | 6/2000 | Messerly et al. | 704/9 |
| 6,161,084 | A | * | 12/2000 | Messerly et al. | 704/9 |
| 6,243,396 | B1 | * | 6/2001 | Somers | 370/469 |
| 6,246,977 | B1 | * | 6/2001 | Messerly et al. | 704/9 |

FOREIGN PATENT DOCUMENTS

| | | |
|---|---|---|
| CA | 2192502 | 6/1997 |
| CA | 2236623 | 5/1998 |
| EP | A 0529130 | 3/1993 |

OTHER PUBLICATIONS

A common multi–agent testbed for diverse seamless personal information networking applications, Abu–Hakima, S.; Liscano, R.; Impey, R.; IEEE Communications Magazine, vol.: 36 Issue: 7, Jul. 1998; pp.: 68–74.*

(List continued on next page.)

*Primary Examiner*—Thomas Black
*Assistant Examiner*—Michael B. Holmes
(74) *Attorney, Agent, or Firm*—Cassan Maclean

(57) ABSTRACT

A computer-readable system and method for interpreting and selectively forwarding an interpreted message derived from a user's received electronic message, such as an e-mail, fax, converted voice and pager messages, to a mobile communications device of the user. A structured knowledge base comprises knowledge objects of user-related information and the knowledge objects are interlinked by semantic links to permit dynamic navigation thereof. Navigating means dynamically navigates through the structured knowledge base using the content of the received message and determines key term(s) relating to the content as a result of the navigating. An interpreted message is determined from those key term(s). Prioritizing means determines the priority of the message, selects the second communications device based on the current context of the user and the content of the message in relation to the user-related information and assigns priority indicia to the interpreted message according thereto. Forwarding means forwards the interpreted message to the second communications device when the priority indicia assigned to the interpreted message represents that the interpreted message is to be so forwarded.

15 Claims, 8 Drawing Sheets

OTHER PUBLICATIONS

Intelligent seamless messaging, Meech, J.F; Abu–Hakima, S.; Systems, Man, and Cybernetics, 1998. 1998 IEEE International Conference on, vol.: 2, 1998 pp.: 1241–1244 vol. 2.*

Integrating multimodal message across heterogeneous networks, Liscano, R.; Impey, R.; Qinxin Yu; Abu–Hakima, S.; Enterprise Networking Mini–Conference, 1997. ENM–97. In conjunction with the ICC–97., First IEEE, 1997 pp. 45–53.*

Hypertext and Structured Object Representation: A Unifying View, Herman Kaindi; Mikael Snaprud; (ACM 1991) Hypertext '91' Proceeding, Dec. 1991, pps. 345–358.*

An Intelligent Agent for High–Precision Text Filtering, Adrian O'Riordan; Humphrey Sorenson; (1995 ACM) pps. 205–211.*

Semantic–based Information Brokering, Vipul Kashyap; Amit Sheth; (1994 ACM) CIKM '94' pps. 363–370.*

Knowledge based retrieval of office documents, Augusto Calentano; Maria Grazia fugini; Silvano Pozzi; (1990 ACM) pps. 241–253.*

A Conceptual Modeling Approach to Authoring–in–the–Large for Hypertext Documents, Rick Sobicsiak; John Mylopoulos; (1991 ACM) pps. 225–239.*

A Semantics approach for KQML—a general purpose communication language for software agents, Yannis Labrou & Timm Flinn, (1994) ACM 0–89791–674–3/94/0011.*

"Protocols for the construction of knowledge repository by multiple users," "The Query & representation languages of WebKB," & "The WebKB set tools" Philippe Martin, Oct. 14, 1996, Griffith University School of Information Technology, Australia.*

Wick et al: "An Explanation Facility for Today's Expert Systems", IEEE Expert, vol. 4, No. 1, Mar. 1989, pp. 26–36.

"A System for the Seamless Integration of Personal Messages Using Agents Developed on a Lotus Notes Platform". CASCON 96: Meeting of the Minds: Nov. 12–14, 1996. Published on CD ROM.

"A Common Multi–Agent Testbed for Diverse Seamless Personal Information Networking Applications", Abu–Hakima et al, IEEE Communications Magazine, Jul., 1998.

* cited by examiner

{ ROOT }
CONTACT
ORGANIZATION
PROJECT
PERSONAL
PROFESSIONAL
COMPANY
UNIVERSITY
GOVERNMENT
ME
FAMILY
FRIENDS
WORK
SCHOOL
A
B
X

APPARATUS AND METHOD FOR INTERPRETING AND INTELLIGENTLY MANAGING ELECTRONIC MESSAGES

FIELD OF THE INVENTION

The invention pertains to the field of intelligent electronic message management and, more particularly, to an apparatus and method for intelligently handling a user's received electronic messages such as e-mail, fax, converted voice and pager messages.

BACKGROUND OF THE INVENTION

Electronic messaging systems governed by a static set of instructions or equations are known in the industry and can be used to provide fixed (selection-based) services to the public. For example, a testbed for a seamless personal information networking (SPIN) system was developed by the National Research Council (NRC) of Canada and is described in the paper entitled "A Common Multi-Agent Testbed for Diverse Seamless Personal Information Networking Applications", Abu-Hakima et al, IEEE Communications Magazine, July 1998, pages 68–74. According to the SPIN system therein disclosed seamless messaging allows users to communicate through heterogeneous networks, such as through e-mail and cellular telephone networks, whereby e-mail messages received at a user's desktop may, to a limited extent, be summarized to form a text (or voice) message in form for transmission to the user's wireless communications device (e.g. cellular telephone). The referenced SPIN system also contemplates the use of limited user-specified constraints which are configured and interpreted as rules to produce fixed results for the decision-making governing the handling of a message.

Such systems which are known to date are simple rule-based systems and they are unable to dynamically interpret the content of a received message or achieve intelligent decision making based on the context of the message, the user and the user's communications devices. Further, such systems cannot themselves enhance or build upon any designated static set of rules governing their operation. Consequently, such prior art messaging devices are unable to effectively handle the developing needs of persons (users) in business and organizational environments who may receive a very large number of separate messages on a daily basis, some being of no interest and some being urgent depending upon the context. In such environments the time constraints of users does not always allow them to input, as user-specified data, the changing (dynamic) information which is required by such systems for effective operation. Coupled to the burgeoning use of electronic messaging, and other forms of personal communication, is the growing mobility of persons. The result is a business environment in which there is a strong need for means of intelligently and automatically handling electronic messages ("e-messages") on the basis of the time-specific context (i.e. the current location and activity) of the individual addressee (user) and the content of the message. There is also a need for such means utilizing user preferences data which may be developed dynamically but without necessarily requiring the user to take the initiative to input or update such data.

SUMMARY OF THE INVENTION

In accordance with the invention there is provided a computer-readable system for interpreting the content of an electronic message received by a communications device integral with or interfaced to the computer. A structured knowledge base comprises knowledge objects of user-related information, the knowledge objects being interlinked by semantic links. Navigating means dynamically navigates through the structured knowledge base using the content of the received message and determines key term(s) relating to the content as a result of such navigating. Identifying means identifies to a user of the system an interpreted message determined from the key term(s).

Also in accordance with the invention there is provided a computer-readable system for managing electronic messages received by a first communications device and redirecting selected ones of those messages to a second communications device selected by the system. Monitoring means monitors the first communications device for a received message. A computer-readable system according to the foregoing interprets the content of the received message. Prioritizing mean prioritizes the interpreted message whereby the prioritizing means determines the priority of the message and selects the second communications device based on the current context of the user and the content of the message in relation to the user-related information and assigns priority indicia to the interpreted message according thereto. Forwarding means forwards the interpreted message to the second communications device when the priority indicia assigned to the interpreted message represents that the interpreted message is to be so forwarded.

Preferably, explanation means is provided for tracing the steps taken by the navigating means and for creating an explanation as to a particular action taken by the system, or failure of the system to take a particular action, in response to a request for such explanation by the user. The explanation means may also determine the steps which would be taken by the navigating means under one or more user-specified conditions and create an explanation as to the particular action which would be taken by the system under those conditions in response to a request for such explanation by the user. Messageback processing means is preferably also provided for processing a message received back from the second communications device following the forwarding of the interpreted message. A reply message replying to the received message is prepared and forwarded and means is provided for engaging the explanation means if the message received back includes a request for an explanation of action taken by the system.

Learning means is preferably included for learning new user-related information wherein tracing means traces the actions taken by the user in the handling of received messages and identifying means identifies the new information from the tracing means. Means for incorporating the new information into the knowledge objects is also provided.

Further in accordance with the invention there is provided a method for interpreting the content of an electronic message received by a user's communications device and a method for managing electronic messages received by a user's first communications device and redirecting selected ones of those messages to a selected second communications device.

DESCRIPTION OF THE DRAWINGS

The present invention is described in detail below with reference to the following drawings in which like reference numerals refer throughout to like elements.

DETAILED DESCRIPTION OF A PREFERRED EMBODIMENT

Figure 1:
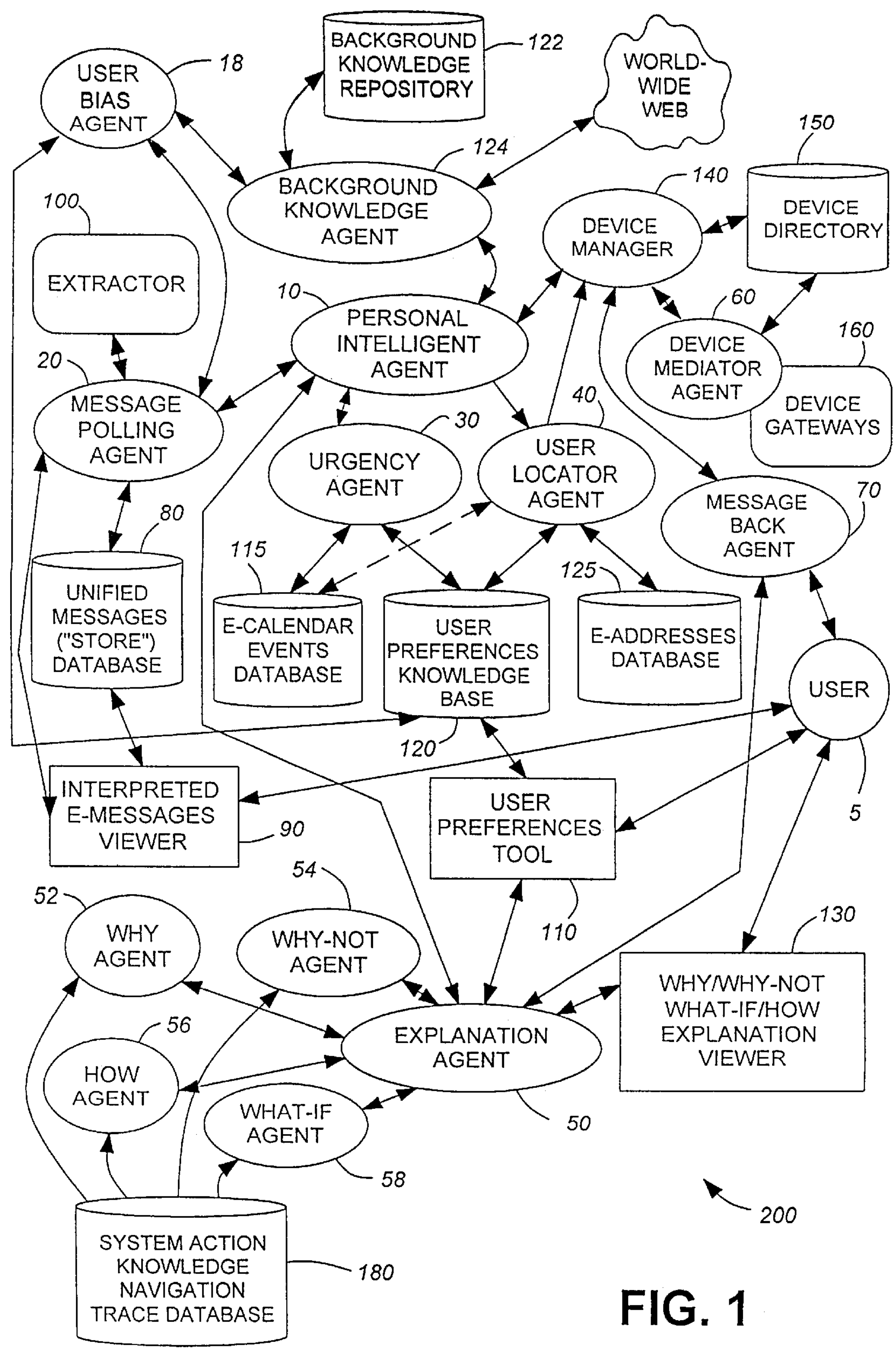
FIG. 1 is a modular component diagram showing the operational components of an intelligent message management system in accordance with the invention (various of these components being capable of being distributed in a user desktop, a server and/or a user's mobile device, depending upon the desired application, some examples of which are illustrated in FIG. 5)

FIG. 1 of the drawings shows the components of a preferred intelligent message management system 200, comprising means for interpreting a received e-message in accordance with the invention. It is to be noted, however, that the user's electronic calendar—"e-calendar" and electronic addresses-"e-address" components 115 and 125 are utilized by the subject system 200 but are typically already resident in the user's desktop. Therefore, the components 115 and 125 are, in the preferred embodiment, separate from the system 200 (but, if needed for any particular application, could readily be included in the system 200). The system 200 provides a number of different intelligent agents to act in respect of certain objectives and complete certain tasks assigned to them. A personal intelligent agent 10 acts as a central controller and interacts with the other agents and system components. An agent is defined to be a segment of computer software which can be autonomous and/or mobile, is implemented as a component or object, has a state and is able to interact with its environment and to act both proactively and reactively. The intelligent agents of the system 200 are agents which can sense, reason, communicate, learn new knowledge and/or reorganize existing knowledge.

Figure 2A:
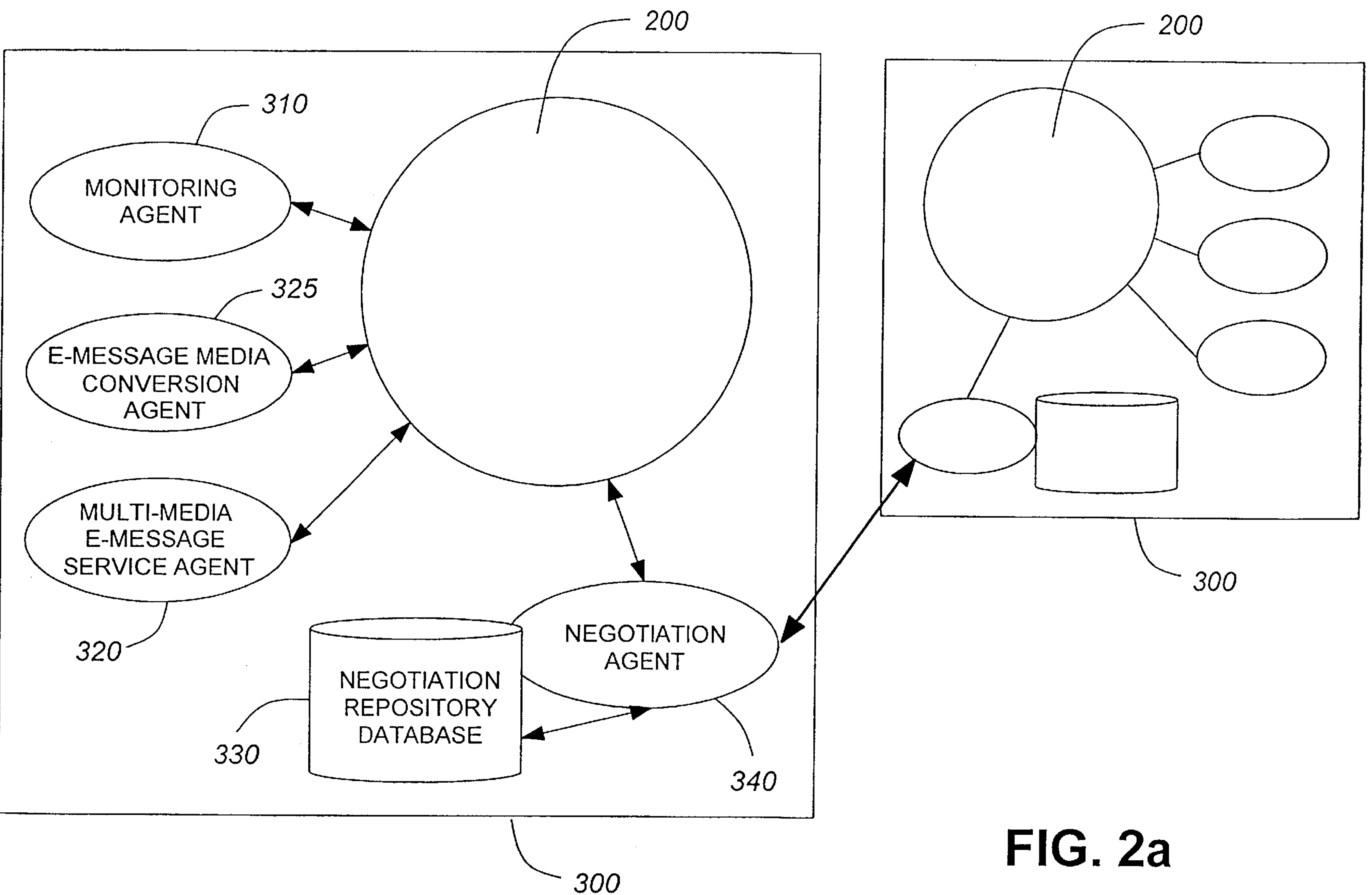
FIGS. 2*a* and 2*b* are modular component diagrams showing additional intelligent operational components which may be added to the system shown in FIG. 1 to achieve a greater degree of system intelligence and autonomy.

Referring to FIG. 1 a message is received at a communications device of the user, being any of a desktop (the term "desktop" throughout referring to a computer, whether mobile or stationary) through a server, a cellular telephone, a telephone or a personal digital assistant such as, for example, a Palmpilot™, or other wireless hand-held device (the term "PDA" hereinafter referring generally to a personal digital assistant and/or wireless hand-held device), the message being in the form of an electronic message ("e-message") . A message polling agent 20 provides means for monitoring the receipt of a new e-message by the communications device. If the e-message is determined by the polling agent 20 to comprise text it is forwarded to an extractor 100 which extracts key words, terms and phrases from it. The e-message polling agent 20 returns the header information (typically comprising sender, time and subject information) of the received e-message and the extracted key words, terms and phrases to a user bias agent 18. (If the e-message is not text, such as voice mail or a fax, it must first be forwarded to an e-message media conversion agent 325, as shown in FIG. 2*a*, to have it converted to text and that text is then forwarded to the extractor 100.) The extractor used by the inventor utilizes a computer program produced by NRC (described at the Internet website http://extractor.iit.nrc.ca) which receives a text file as input and generates a list of key words, terms and/or phrases as output.

The extractor 100 works in conjunction with a user bias agent 18 which also processes a received e-message to check its content (in the preferred system this includes the header thereof and any attachment thereto) for any key words, terms and/or phrases which have been set by the user and obtained by the user bias agent 18 by navigating through a user preferences knowledge base 120 of the message management system 200. The user-set keywords are handled on an "include" or "exclude" basis so that both important and unimportant words, terms and phrases (i.e. from the perspective of the user) may be included or excluded, respectively, in producing an interpreted message from the e-message.

When the user bias agent 18 interprets the e-message by navigating the user preferences knowledge base 120 it may also utilize information contained in a background knowledge repository 122 if such is of assistance to interpret the e-message. The background knowledge repository 122 provides to the user bias agent 18 a base of knowledge which is available from the time of start-up of the system, the information of this repository being generic (unlike the user preferences knowledge base which is user specific). A background knowledge agent 124 is provided to co-operate with the user bias agent 18. The background knowledge agent 124 also acts to update the background knowledge repository 122 with current information about organizations by periodically accessing and searching the world wide web through the Internet. This is triggered by the content of the e-message such as the receipt of a term which could be the name of an organization. The background knowledge agent 124 constructs a URL name which it then tries to match to an entry in a central domain name database such as DNS. Therefore, even if the user does not initially complete (or, later, does not update) the user's preferences information of the knowledge object templates of the user preferences knowledge base 120, the user bias agent 18 may identify information from the background knowledge repository 122 which is of assistance to it to navigate the user preferences knowledge base 120 and interpret the e-message.

The key words, terms and/or phrases and a header compiled by the user bias agent 18, hereinafter collectively referred to as key terms, together form an interpreted e-message which is associated with the original e-message. The header information of the interpreted e-message (if any) is not necessarily the same as or in the same format as the header information of the received message. A store of unified indexed e-messages 80 contains all original received messages and an interpreted e-messages viewer 90 is provided to enable the user to review the interpreted messages produced by the user bias agent 18.

Figure 4:
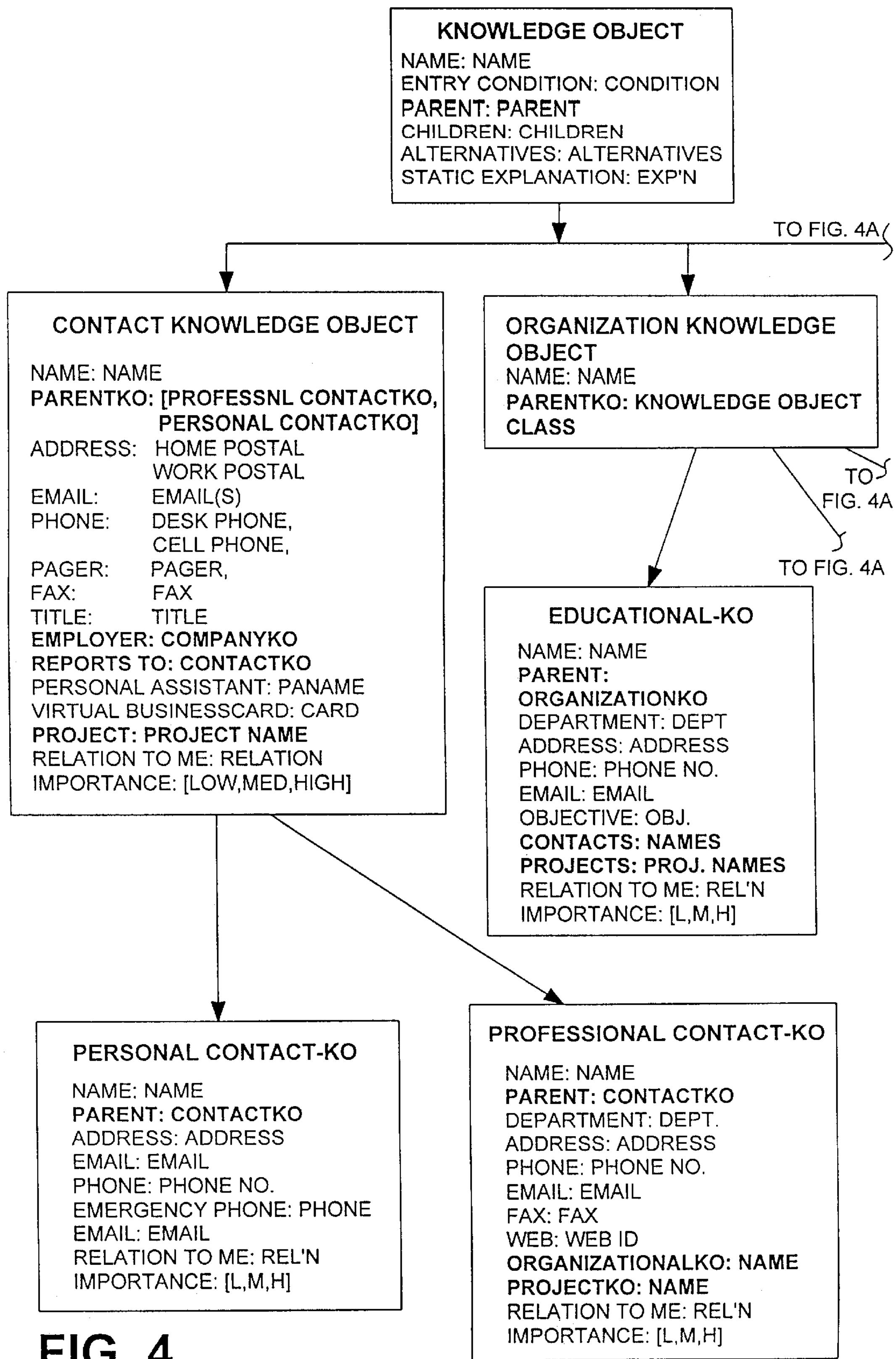
FIG. 4 is a graphical representation of the structure of, and the relationships between, the knowledge objects of the user preferences knowledge base and showing the templates of information that may be contained in the different knowledge objects of the user preferences knowledge base illustrated in FIG. 3; and, FIG. 5 is a series of block diagrams, namely FIGS. 5*a*, 5*a*', 5*b*, 5*b*', 5*c* and 5*c*', illustrating examples of different personal communications systems in which selected components of the message management system of the invention may be utilized by various elements of the system such an Internet service provider (ISP) or enterprise server.
Figure 4A:
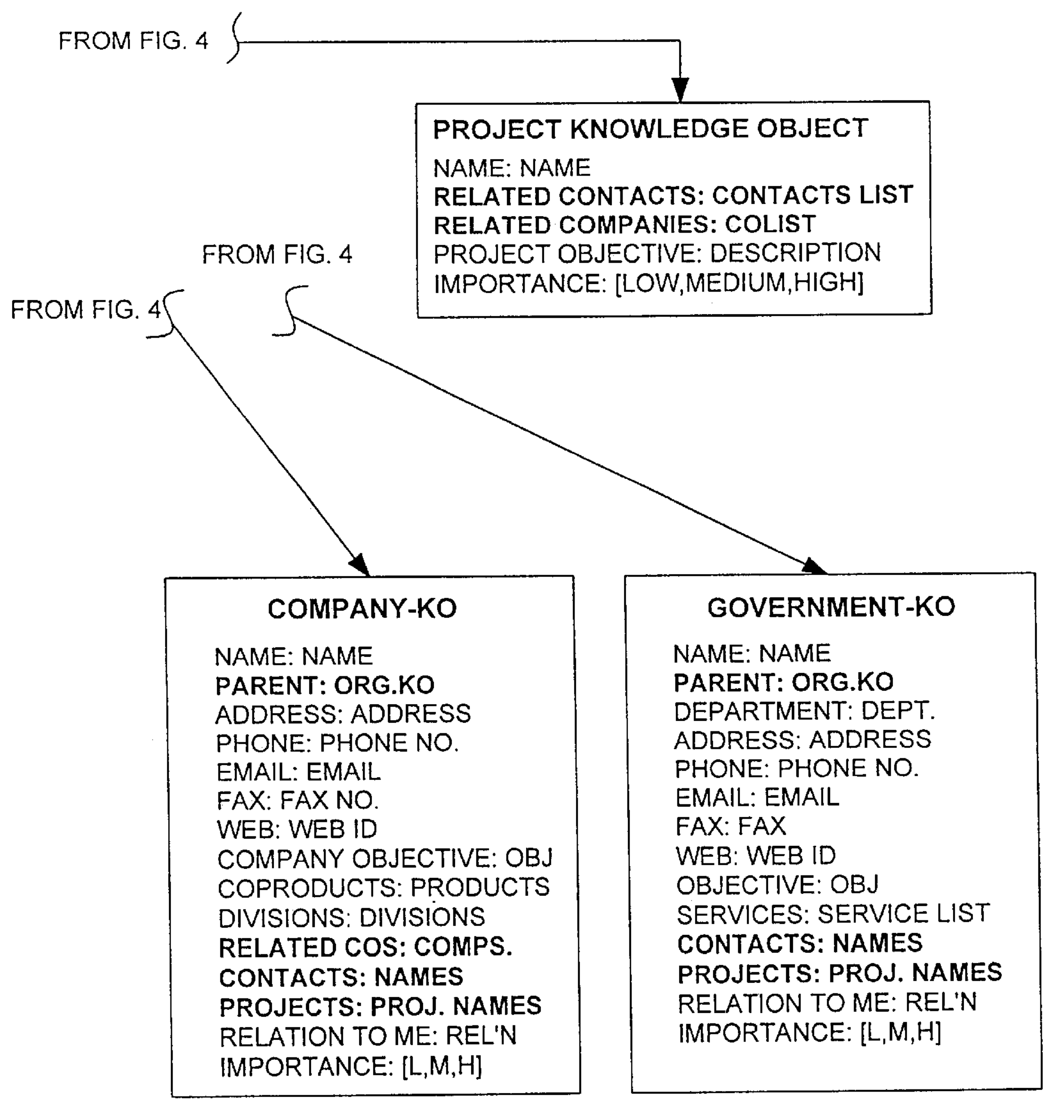

After the interpreted message is produced by the user bias agent 18 it is forwarded to the personal intelligent agent 10 which forwards it to the interpreted e-messages viewer 90 and an urgency agent 30. The urgency agent 30 prioritizes the interpreted message by tagging to it one or more priority indicia from which the relative urgency and user-preferred handling of the message are dynamically determined and acted upon by the system 200. In doing so the urgency agent 30 navigates the user preferences knowledge base 120 which comprises static knowledge objects containing the user's contact, project and organizational information. Dynamic user preference information is created through navigation of the knowledge objects and their instantiation from dynamic e-message content, e-message header, e-calendar and e-address information. The information segments contributing to the user preferences knowledge base 120 are generally illustrated by FIG. 4. The urgency agent 30 also accesses the e-calendar 115 and e-addresses 125 information sources which are provided within the user's distributed workspace, i.e. at a desktop or PDA, separately from the messaging system 200 but which the system agents are able to access.

As illustrated by FIG. 4, the user preferences knowledge base 120 comprises a rich source of interlinked user-related information embodied in a plurality of knowledge objects (also represented in FIG. 4 by the annotation "KO") . The knowledge objects (KO) are directed to user-related contacts, projects and organizations that assist the system 200 to intelligently interpret and manage received e-messages by determining the priority preferences of the user. The knowledge objects are populated based on a template of fields that include the name of the object and relevant fields that relate it to other knowledge objects. As such the fields are either descriptive or used for navigation. The knowledge objects and information fields shown in bold in FIG. 4 show information which is interlinked in the user preferences knowledge base 120 and thus can be used to navigate the links. (New fields may be added by the user, if desired.) In addition, the explicit parent relation of each knowledge object is used to link back to the parent knowledge object.

Three key knowledge objects are used in the illustrated system 200: a contacts knowledge object, an organization knowledge objects and a projects knowledge object. These are further refined into personal and professional contacts knowledge objects (under the contacts knowledge object) and government, education and company knowledge objects (under the organization knowledge object). In the case of the contacts information of the knowledge base 120 the descriptive fields of the contact knowledge object define the name of the knowledge object, the name of the contact, the addresses of the contact, the organization the contact is associated with as well as the reason the contact is included in the contact knowledge object. Navigation fields may include the name of the knowledge object parent(s), its children, alternative knowledge objects, knowledge object entry conditions and other information or algorithms. Each knowledge object is concept-based (not rule-based) and may contain any number of facts, rules and/or algorithms. The contacts knowledge object is interlinked to the contacts/e-addresses database of the user's desktop so that only one contacts directory is seen by the user for access, inputting and updating purposes.

An e-mail message received by the system will normally have a conventional format which the system can recognize such as the following address formats which are common at the present time:

contact@organizationName.com, contact@organizationName.edu, contact@organizationName.gov In view of this, the system also makes use of the URL information of the e-mail message to navigate the knowledge objects network.

Figure 3:
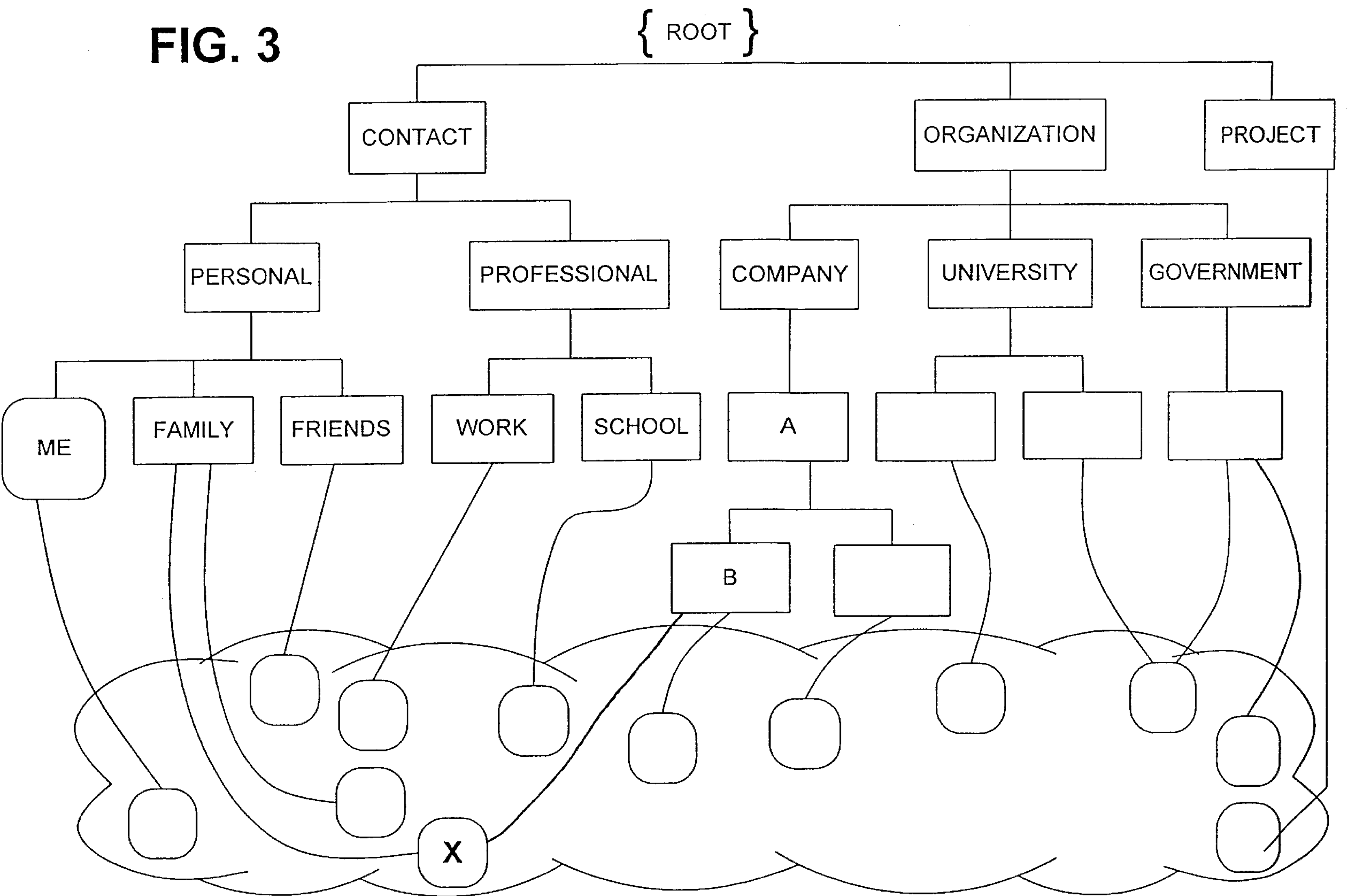
FIG. 3 is a block diagram of the structure of a user preferences knowledge base comprised of distinct knowledge objects and showing a single object (representing a person, marked by an "X") accessed through two different navigation options (these options being dynamically instantiated based on e-message header and e-message content as well as e-address and e-schedule information within the knowledge objects)

As shown by FIGS. 3 and 4 the knowledge objects of the user preferences knowledge base 120 are organized into a multi-hierarchical network. A loose tree structure, derivative of a directed or semantic network, defines the network of the system such that each leaf of the tree structure is a knowledge object. Thus, each knowledge object (leaf) can refer to a related knowledge object (related leaf) and each knowledge object is aware of which knowledge object is its parent node. In FIG. 3, at the fourth hierarchical level, a special contacts knowledge object designated "Me" is provided to represent the user and this object will have both personal and professional knowledge objects linked to it. As shown by FIG. 3, many other knowledge object templates are also provided at the fourth level of the knowledge base structure, including those for Family, Friends, Work, School and generic objects to represent departments in government or universities or subsidiaries of companies. Leaf nodes are provided at the lowest level of the network structure and a single leaf may be referenced by navigating through more than one higher-level knowledge object. For example, the network of FIG. 3 shows a person "X" being referenced by navigating through either the contacts knowledge object or the organization knowledge object. In addition to these hierarchical links, the linking of specific fields of knowledge objects to other knowledge objects as illustrated (by way of example) by the information fields shown in bold in FIG. 4 advantageously creates a non-linear, integral interlinking of the knowledge objects. This multi-level interlinking of the knowledge objects is referred to herein as semantic linking.

The priority indicia established by the urgency agent 30 may include an e-calendar tag identifying an e-calendar event and establishing a real-time context for the message in relation to the user, an urgency tag based on determinations made by the urgency agent from navigating the user preferences knowledge base to establish dynamic priority user preferences and/or an action tag, based on determinations made by the urgency agent from navigating the user preferences knowledge base, directing the system to, for example, delete the message if it has been determined to be trash by the user preferences, file the message into a designated directory (in which case the sorting tag would direct that the message be filed and would also identify the name of the folder into which the message is to be filed) and/or forward the message to a designated person or group of persons.

An example of how the user preferences could be dynamically interpreted is shown in the following table:

TABLE 1

| When: | What: | Context: | Then: |
|---|---|---|---|
| subject or content | includes "offer" | user is in a meeting | route to pager |
| subject or content | includes "offer" | user is in any context except a meeting | route to cell-phone |
| sender | equals "home" | user is in any context | route to cell-phone |
| subject or content | includes "call for papers" | user is in any context | do not route |
| subject or content | includes "junk mail" | user is in any context | move message to trash, do not route |
| content | is not matched | user is in any context | move message to "unknown" |

TABLE 1-continued

| When: | What: | Context: | Then: |
| --- | --- | --- | --- |
| | | | folder, do not route |
| subject or content | includes "assignment" | user is in any context | move message to "school folder", do not route |

According to the user preferences of Table 1 a summary message having in it the word "offer", such as a message advising of an offer for purchase, would be assigned priority indicia directing that the message be forwarded to the user's pager if the user is in a meeting or to the user's cell-phone if the user is not in a meeting. A message from a family member (i.e. from home) would be prioritized so that it is always forwarded to the user's cell-phone. A message calling for papers would in no case be forwarded and junk mail would be immediately trashed (and not forwarded). Messages not matched to any key phrases in the user preferences would be filed in an folder named "unknown" and not forwarded. A message relating to an assignment would be filed in a "school" folder and not forwarded.

The urgency tag determined by the urgency agent 30 includes an identifier for the communications device to which the message is to be forwarded. This information is determined by the urgency agent according to the following formulae:

$$U_m\text{=message urgency=max}[U_k(k(e)),U_s(s)]$$

where, e=extracted text from incoming message k=user defined key phrases, associated with importance ($U_{k1}$, $U_{k2}$, $U_{k3}$)

s=user defined importance of the sender of the message ($U_{s1}$, $U_{s2}$, $U_{s3}$)

c=user defined interruption ranking of the context ($U_{c1}$, $U_{c2}$, $U_{c3}$)

d=user defined device used to deliver the message (cell-phone, pager, null, . . . ) and, $$d=U_m+U_c(c)$$

whereby, the message urgency is passed to the function that determines the urgency of the e-message relative to the user context. The message urgency is mapped to the preferences governing the interruption of the user, which in turn is mapped to the desired delivery device for the urgency and context. For example, (highest message urgency)+(user context=meeting) - - - route to cell-phone (medium message urgency)+(user context=meeting) - - - route to pager (lowest message urgency)+(user context=meeting) - - - do not route The personal intelligent agent 10 receives the priority for the interpreted e-message from the urgency agent 30 and, if the priority indicia identifies that the e-message is urgent and should be forwarded to another communications device of the user, such as a wireless device, the interpreted e-message is forwarded to the user locator agent 40. The user locator agent 40 accesses and reviews the user's e-calendar 115, as well as the status of the user's designated communications devices identifying any recent activity of the devices (i.e. by a device monitoring utility which monitors whether the user's telephone is in use by monitoring whether it is on-hook or off-hook, whether the user's pager or cellular telephone is on or off and whether a PDA is active or inactive), to determine the context of the user and identify the communications device(s) which the user is proximate to. The user locator agent 40 also accesses the e-address database 125 of the user to identify the user's current contact information and the name and organization of the sender of the message. If the user locator agent receives conflicting information about the location of the user and the device(s) to which the user has access, it makes use of a probability function to select the most likely device that the user can be reached through.

The personal intelligent agent 10 forwards to a device manager 140 the interpreted message, the sender information and an identification of the communication device(s) to which the message is to be forwarded. The device manager 140 forwards this information and identity information for the communications device(s) to a device mediator agent 60 which then formats the message appropriately for the particular type of communications device to which it is to be forwarded. The formatted message is then transmitted through device gateways 160. For example, if the communications device is a Palm Pilot™ (PDA) the content of the text of the interpreted message is tailored to match the size of that device's display panel. A device directory 150 contains the identity of, the means of communication with and the characteristics of each of the user's mobile communications devices. The messages are forwarded to the user's mobile communications device using e-mail addresses, internet protocol addresses, a cellular phone number or, if such addresses are not available to the device, through an external gateway for paging or wireless telephony which is able to route the message to the mobile device.

The user preferences knowledge base 120 is interfaced to the user through a user preferences tool 110 which enters user-directed information into the knowledge objects for user contacts, projects, organizations. Some ranking information may be included in this user-directed information for ranking the relative importance of those contacts, projects and organizations to the user. On the forwarding of messages the user preferences tool 110, through an explanation agent 50, also allows the user to query "why" or "why not" an action was taken by the system and, through a "what-if" explanation facility of the explanation agent, to test what actions would be taken by the system under user-specified conditions.

The ability of the user to query and test the system through the explanation agent 50 allows the user to develop confidence in the system and is of assistance to the user in setting up their user preferences knowledge objects so that the system operates optimally according to the preferences of the user. It also provides to the user a useful tool for debugging the decisions made by the system and the actions it takes.

Four sub-agents of the explanation agent 50, namely, the why agent 52, the why-not agent 54, the how agent 56 and the what-if agent 58, provide tailored explanations as to why an action was taken, why an action was not taken, how an action can be taken and what would happen if particular parameters were to be dynamically determined as a result of an e-message, respectively. Where the system has acted dynamically in the handling of an e-message and the user wants an explanation with respect to the action taken, the user may ask for an explanation in the form of a "why" or "why not" query. In response to such a query the explanation agent 50, through the why sub-agent 52 or why-not sub-agent 54, generates an explanation based on the sequence of actions which were taken by or would be taken by the system's personal intelligent agent 10, the urgency agent 30, the user locator agent 40 and the device mediator agents 60. All of the actions taken by these agents are automatically recorded by the system in a system action knowledge navigation trace database 180 and this information is used by the why and why-not agents 52,54 of the explanation agent 50. The system action knowledge navigation trace database 180 is an indexed record of the system's navigation of the user preferences knowledge base 120 given the dynamic information embodied within the e-message and the context of the user (utilizing e-calendar, e-address and device status information). The generated explanation is displayed to the user through an explanation viewer section 130 of the desktop display.

A messageback agent 70 is provided to enable the user to send back to the system, from the user's mobile communications device, an acknowledgment or other type of action directive and/or a request for an explanation. After an interpreted message has been forwarded to the device agent 60 by the personal intelligent agent 10 for sending to the user's mobile communications device, the personal intelligent agent 10 waits for any message received back from the messageback agent 70. The user may request, through the messageback agent 70, that a message be acknowledged or forwarded to a specified person or group of persons. The user may also request a "why" or "why-not" explanation. The personal intelligent agent 10 acknowledges or forwards the message as instructed and, if an explanation is requested, refers the user's query to the explanation agent 50. When an explanation is generated by the "why" or "why-not" agent it is forwarded to the user's mobile communications device through the messageback agent 70. The messageback agent 70 directs the device manager 140 through the device mediator agent 60 and its device gateways 160 to tailor the message to a pager, PCS phone or any other hand-held device registered to the user.

Figure 2B:
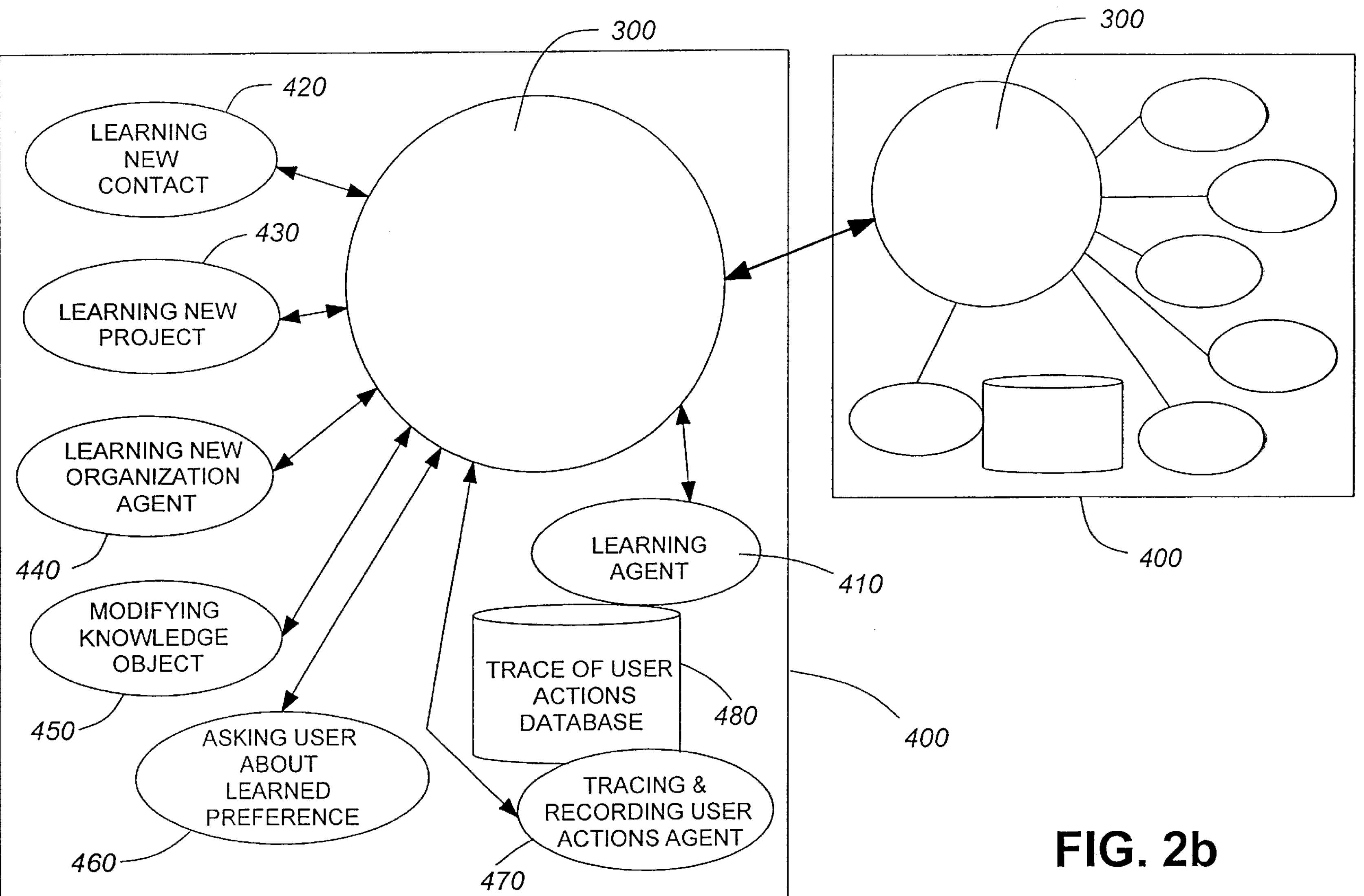

FIGS. 2*a* and 2*b* illustrate additional intelligent operational components which may be added to the system 200 (of FIG. 1) to achieve a greater degree of scope, intelligence and autonomy for the system. As shown in FIG. 2 a number of agents are provided in an enhanced message management system 300 to permit the receipt of different forms of messages (text, voice or fax) and, where necessary, to convert those messages to electronic text form for processing by the message management system 200 shown in FIG. 1. A multi-media e-message service agent 320 receives an e-mail from a server, a voice mail from either a server or a telephone (the latter when the recorded message is obtained by the agent by dialing the phone number or accessing the indexed digital voice database of the device on which the voice message was left), a fax from the desktop or an electronic fax server and a pager message from a server or the pager device itself. An e-message media conversion agent 325 converts fax messages, voice messages and e-mail attachments to text in order that their content may be interpreted as described above by means of extracting the key words, terms and phrases from them and using those key words, terms and phrases and other e-message content to dynamically navigate the user preferences knowledge base 120. An optical character recognition (OCR) device is used to convert a fax message to text and a speech recognition device is used to convert a voice message to text.

When a user's desktop is networked into an enterprise's computer network, and subject to confidentiality rules and protective mechanisms governing the system 300, a negotiation agent 340 allows the message management system 300 of one user to exchange information of the e-calendar and e-address databases 115, 125 and the user preferences knowledge base 120 of that system 300 with such information of other persons' systems 300 in the network. To do so the negotiation agent 340 may dispatch a mobile proxy agent to locate desired information from another system user in the enterprise network or from the World Wide Web via the Internet. A secured negotiation repository database 330 contains all negotiation knowledge and commands used by the negotiation agent 340.

A monitoring agent 310 is also provided in the message management system 300 illustrated by FIG. 2*a*. The monitoring agent 310 results are accessible through the user preferences tool 110 and is responsible for three actions. One is to monitor what happens to a message so that the explanation agent 50 can explain to the user what action was taken on an e-message. A second is to trap a failed message delivery to enable the system 300 to automatically attempt to retransmit the message. A third is to diagnose any user preferences conflicts, the key being the identification of any conflicts in the user preferences knowledge base 120.

In the enhanced message management system 400 illustrated by FIG. 2*b* the object is for the system to automatically learn and populate the knowledge objects of the user preferences knowledge base 120. As such, a novice user who starts with the default knowledge objects can, simply by using the system 400, have their knowledge objects adapt to their on-going messaging behavior. To achieve this the system 400 monitors the actions taken by the user in sorting, deleting and forwarding received e-messages and, based on activity patterns established by the users actions, the user preferences tool 110 may initiate queries to the user asking whether it should enter that acquired information into one or more of the knowledge objects of the user preferences knowledge base. If, in response to such system queries, the user confirms that such information should be entered the system 400 enters that acquired information into the designated knowledge object(s).

The tracing and recording user actions agent 470 records a trace of the user's actions in the form of compressed keystroke data identifying how the user has handled the user's received messages. As an email or fax is handled at the user's desktop, such as by deleting, filing, forwarding or simply reading it, a trace of such action(s) and an identification of the sender is recorded by the agent 470. A trace of user actions database 480 contains an indexed store of the trace information obtained by the tracing and recording user actions agent 470. A learning agent 410, using a hybrid learning algorithm sometimes of classification in combination with a learning by analogy algorithm, filters the recorded actions of the user and identifies prospective modifications to existing knowledge objects of the user preferences knowledge base 120 and prospective new information for the user preferences knowledge base 120 (e.g. a new field of information may be identified for a particular knowledge object). In doing so the learning agent 410 uses the tracing data of user actions (i.e. the data in the database 480) and a classification algorithm to cluster user actions and identify any patterns of action. Then a learning by analogy algorithm is implemented to compare the clustered groups of action to the existing knowledge objects.

Four sub-agents are utilized by the learning agent 410, namely, a learning a new contact agent 420, a learning a new project agent 430, a learning a new organization agent 440 and a learning and modifying an existing knowledge object agent 450. The learning a new contact agent 420 examines the contacts knowledge objects and matches to them new clustered groups of user actions to identify prospective new contacts. This agent learns in a hybrid manner by analogy or by discovery of missing knowledge. Similarly, the learning a new project agent 430 examines the projects knowledge objects and the learning a new organization agent 440 examines the organization knowledge objects, and these are matched to new clustered groups of user actions to identify prospective new projects and organizations. The learning a new organization agent 440, through a mobile proxy agent, also accesses and utilizes the World Wide Web to learn organizational information, such as addresses, from external organization web sites. The agents 430 and 440 also learn in a hybrid manner by analogy or by discovery of missing knowledge. An attempt can be made, through the negotiation agent 340, to confirm an identified prospective new contact, project or organization with the information held by another person's system in an enterprise network.

On asking the user about a learned preference, agent 460 interacts with the user preferences tool 110 to display to the user the prospective new knowledge identified by the sub-agents 420, 430 and 440. The user may be asked to confirm whether or not the system is to modify or add to the user preferences knowledge base 120 the identified new knowledge. A learning and modifying agent 450 either adds the identified knowledge or updates existing knowledge of the knowledge objects of the user preferences knowledge base when the user confirms that such action is to be taken. The user may (optionally) instead direct the system to learn automatically in which case the user would not be so queried and the knowledge objects would be modified or updated automatically without querying the user.

Figure 5A:
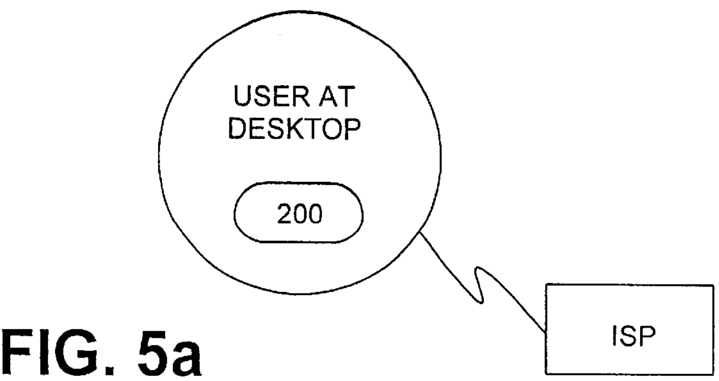
Figure 5A:
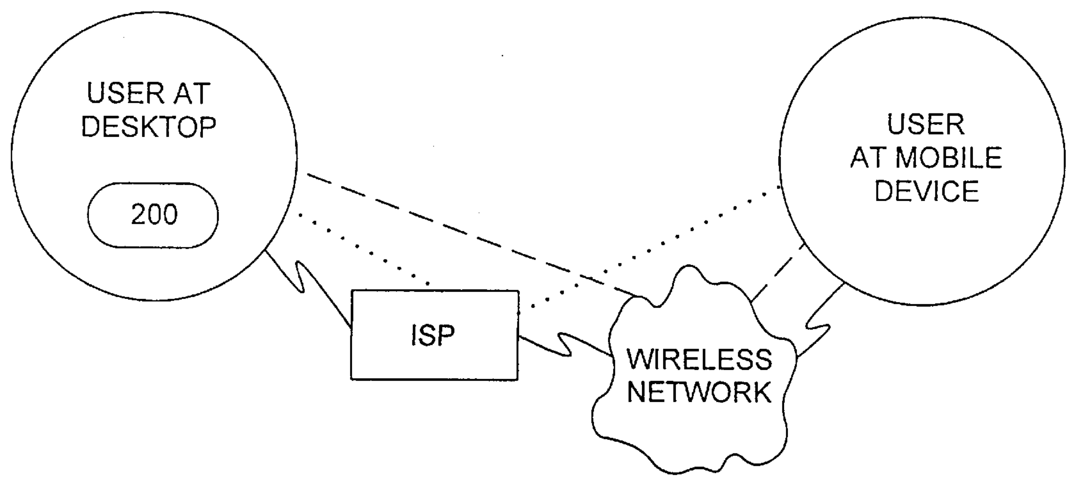
Figure 5B:
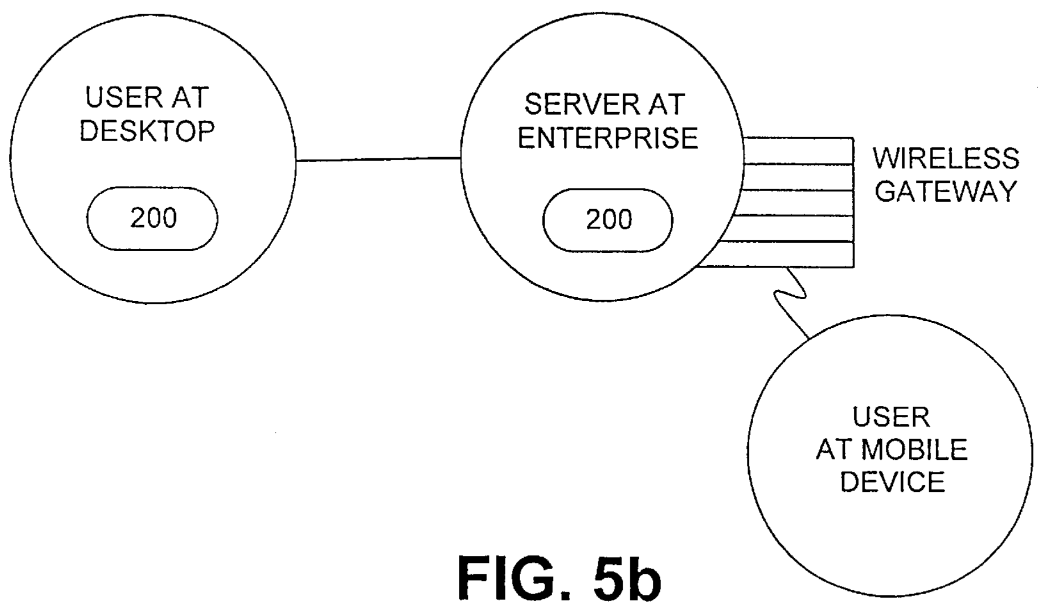
Figure 5B:
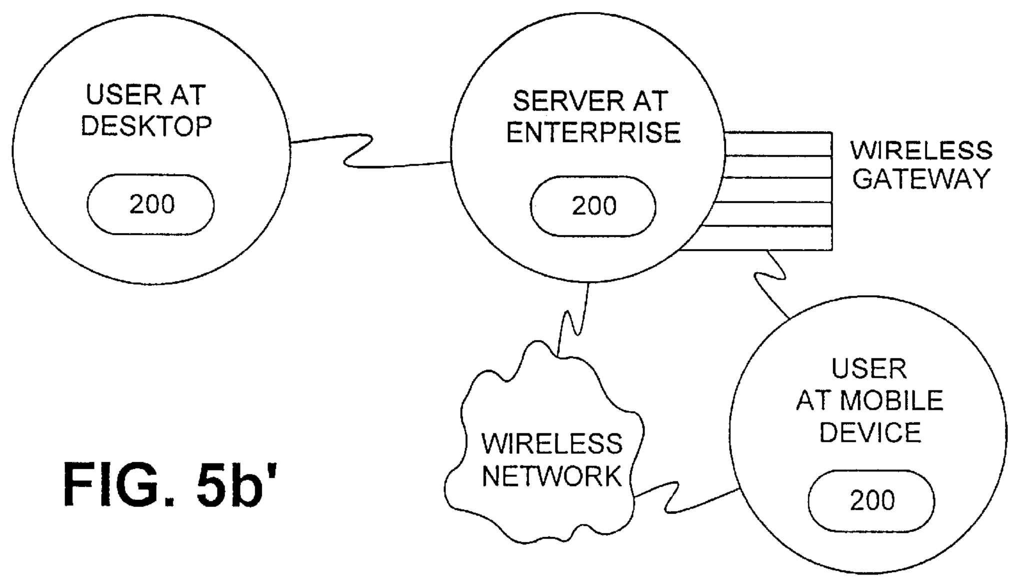
Figure 5C:
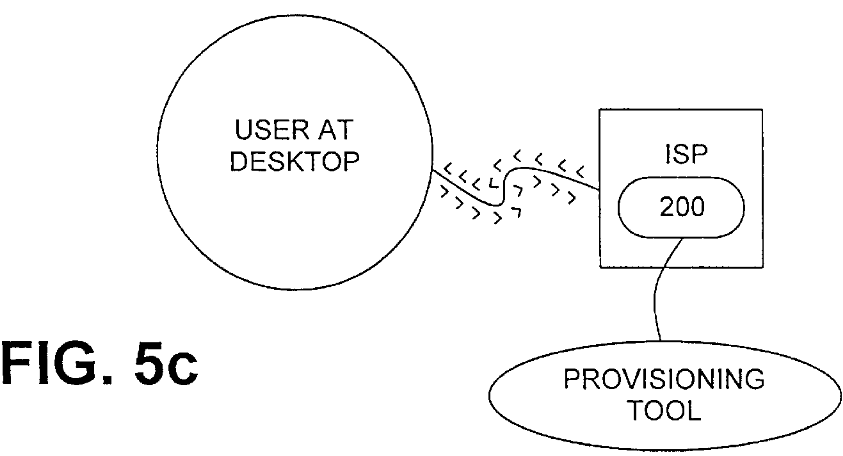
Figure 5C:
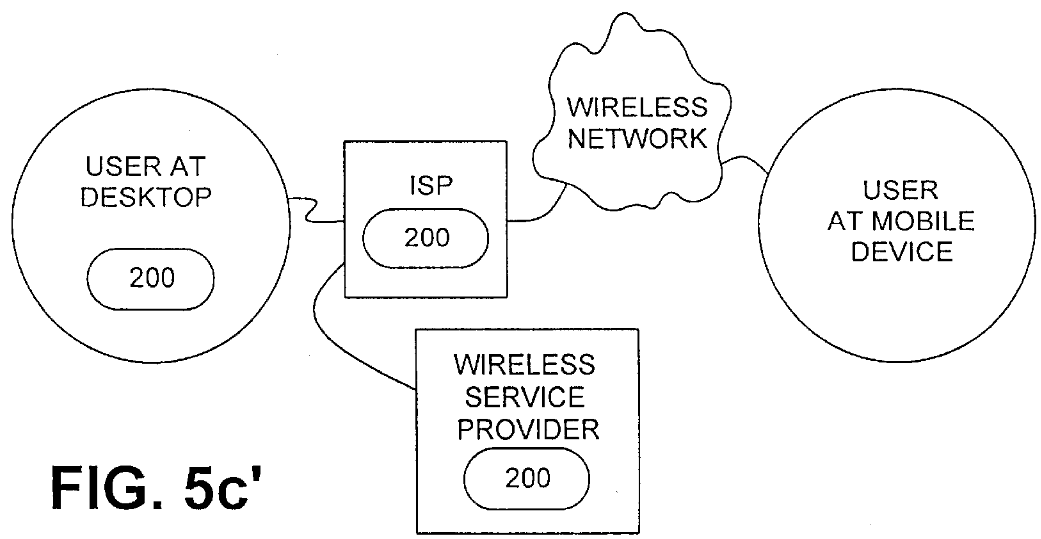

Some or all of the foregoing agents and other components of the subject message management system 200, as well as those of the enhanced systems 300 and 400, can be distributed over the user's desktop, the server and/or the user's mobile device to provide a number of advantages, depending upon the application. The figures comprising FIG. 5 illustrate a number of possible set-ups of the system 200 which might be employed. FIGS. 5*a* and 5*a*' show simple desktop installations of the system, with the set-up of FIG. 5*a* using the system 200 for e-mail management only (i.e. without any accommodation for a mobile communications device) and the set-up of FIG. 5*b* using the system as described herein to re-direct e-messages received at one communications device to another communications device of the user. The set-up of FIG. 5*a* utilizes the system 200 at both the user's desktop and an enterprise server and the set-up of FIG. 5*b*' also uses the system 200 at the user's mobile communications device. An important advantage provided by such a set-up is that the system 200 which is resident at the server can be operational at all times and not just when the user's desktop is operating. A third possible set-up is illustrated by FIGS. 5*c* and 5*c*' in which none of the components of the system 200 is installed at the user's desktop and, instead, the system is installed at a central server such as an Internet service provider (ISP) (as shown, a provisioning tool would then be provided at the ISP to attribute user-specific components to each of a number of different users served by that server, such as user preferences knowledge bases). In this configuration the message management system could be a service offered to users by the Internet service provider. Other system set-ups are possible and it is not intended to limit the invention claimed herein to any one set-up.

It is to be understood that the specific system components and objects described herein are not intended to limit the invention which, from the teachings provided herein, could be implemented and embodied in any number of alternative computer program embodiments by persons skilled in the art. Rather the invention is defined by the appended claims.

What is claimed is:

1. A computer-readable message interpretation system for interpreting content of an electronic message received by a communications device in a network with said computer, said system comprising:

(a) a structured knowledge base comprising knowledge objects of user-related information, said knowledge objects being interlinked by semantic links; and, (b) a plurality of agents configured for:

(i) dynamically navigating through said structured knowledge base using said content of said received message; and, (ii) determining key term(s) relating to said content as a result of said navigating, wherein said agents determine an interpreted message from said key term(s) for communication to said user.

2. A computer-readable message management system for managing electronic messages received by a first communications device and redirecting selected ones of said messages to a second communications device selected by said system, said system comprising:

(a) a message polling agent configured for monitoring said first communications device for a received message;

(b) a computer-readable message interpretation system according to claim 1 for interpreting the content of said received message;

(c) an urgency agent configured for prioritizing said interpreted message wherein said agent determines and assigns priority indicia to said interpreted message and selects said second communications device based on a current context of said user and said content of said message in relation to said user-related information; and, (d) a personal agent configured for directing said interpreted message for communication to said second communications device when said priority indicia assigned to said interpreted message represents that said interpreted message is to be forwarded to said second communication device.

3. A system according to claim 2 and further comprising an explanation agent configured for tracing the steps of said dynamic navigating and for creating an explanation as to a particular action taken by said system, or failure of said system to take a particular action, in response to a request for such explanation by said user.

4. A system according to claim 3 wherein said explanation agent determines the steps of said dynamic navigating which would be taken under one or more user-specified conditions and creates an explanation as to the particular action which would be taken by said system under said conditions in response to a request for such explanation by said user.

5. A system according to claim 4 and further comprising a messageback agent configured for processing a message received back from said second communications device following a forwarding of said interpreted message, wherein said processing comprises preparing and forwarding a reply message replying to said received message and engaging said explanation agent if said message received back includes a request for an explanation of action taken by said system.

6. A system according to claim 5 and further comprising a learning agent configured for tracing the actions taken by said user in the handling of said received messages, identifying new user-related information from said tracing means and incorporating said new user-related information into said knowledge objects.

7. A system according to claim 6 and further comprising a negotiation agent configured for negotiating information between said system and another like system networked therewith.

8. A system according to claim 6 further comprising a device agent configured for formatting said interpreted message appropriate to the display of said second communications device.

9. A system according to claim 6 further comprising a background knowledge repository of pre-populated data, wherein said navigation agent is configured for navigating said background knowledge repository.

10. A system according to claim 9 further comprising a background knowledge agent configured for periodically searching a remote information source for datum and updating said background knowledge repository with said datum.

11. A method for interpreting the content of an electronic message received by a user's communications device, said method comprising the steps:

(a) providing a structured knowledge base comprising knowledge objects of user-related information, said knowledge objects being interlinked by semantic links;

(b) dynamically navigating through said structured knowledge base using the content of said received message and determining key term(s) relating to said content as a result of said navigating; and, (c) determining an interpreted message from said key term(s).

12. A method for managing electronic messages received by a user's first communications device and redirecting selected ones of said messages to a selected second communications device, said method comprising the steps:

(a) monitoring said first communications device for a received message;

(b) interpreting the content of said received message according to the method of claim 11;

(c) prioritizing said interpreted message including determining the priority of said message and selecting said second communications device based on the current context of the user and the content of the message, in relation to user preferences determined from said knowledge objects, and assigning priority indicia to said interpreted message; and, (d) forwarding said interpreted message to said second communications device when said priority indicia assigned to said interpreted message represents that said interpreted message is to be so forwarded.

13. A method according to claim 12 further comprising tracing the steps of said dynamic navigating and creating an explanation as to a particular action taken, or failure to take a particular action, in response to a request for such explanation by said user.

14. A method according to claim 13 further comprising determining the steps which would be taken by said dynamic navigating under one or more user-specified conditions and creating an explanation as to the particular action which would be taken under said conditions in response to a request for such explanation by said user.

15. A method according to claim 14 further comprising learning new user-related information, said learning step including tracing the actions taken by said user in the handling of said received messages, identifying said new information from said tracing means and incorporating said new information into said knowledge objects.

* * * * *